May 10, 1949.                L. J. VESPER                2,469,705
                          REPLACEMENT HANDLE
                          Filed March 4, 1946

LOUIS J. VESPER Inventor

By Lyon & Lyon
        Attorneys

Patented May 10, 1949

2,469,705

UNITED STATES PATENT OFFICE 2,469,705

REPLACEMENT HANDLE

Louis J. Vesper, Los Angeles, Calif.

Application March 4, 1946, Serial No. 651,747

1 Claim. (Cl. 287—53)

This invention relates to replacement handles and is particularly directed to a handle for turning the valve stems employed in connection with plumbing fixtures.

A particular object of this invention is to provide a replacement handle having improved gripping means for engagement with a valve stem.

Another object is to provide a valve handle having vice-like gripping elements which are adjustably mounted with respect to the handle for gripping a valve stem.

Another object is to provide a replacement handle having gripping means which is adapted to engage either circular or non-circular valve stems which may have become worn in service.

Another object is to provide gripping elements which are adjustable radially of the handle and which are V-shaped in cross section for gripping engagement with a valve stem.

A further object is to provide gripping elements of this type having a central depression or recess on the back side away from the V which may receive a movable member mounted on the handle.

Figure 3:
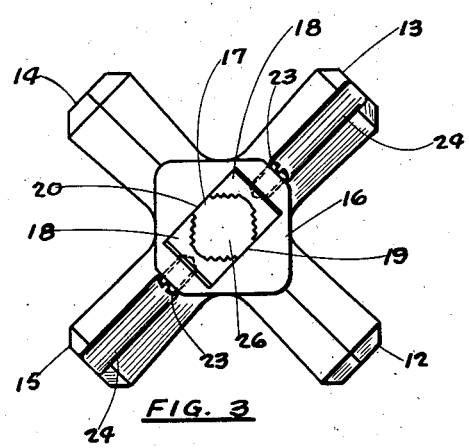
Figure 3 is a view of the underside of the handle shown in Figures 1 and 2.

Referring to the drawings, the cross handle generally designated 10 employs a central hub section 11 from which four arms 12, 13, 14, and 15 radiate outwardly. The handle is preferably provided on its upper surface with the letter "C" or "H" to designate cold or hot. Below the central hub 11 and extending downwardly therefrom is a projection 16 which extends slightly below the lowermost portions of the arms 12 and 14. This projection 16 may be substantially square in outline, as shown in Figure 3, or it may be round or rectangular or any other convenient shape. A recess 17 which is generally rectangular in shape is formed in the projection 16 and extends upwardly into the hub 11.

Mounted within the recess 17 at the opposing ends thereof are the gripping elements or jaws 18. The jaws 18 are slidably mounted between the parallel sides 19 and 20 of the recess 17. The inner face of each jaw is V-shaped in section and is provided with a series of vertically extending notches 21 which are broached in a vertical direction. If desired, additional notches or serrations may be provided at the base of the V, as well as along its sides. A depression or recess 22 is provided centrally of the back face of each of the jaws 18 for reception of the end of a set screw 23 which is threaded radially into the side of the projection 16 directly under two of the arms 13 and 15. In order that the depending length of the projection 16 may be held at a minimum and in order to maintain the position of the set screws 23 midway of the length of the jaws 18, the set screws 23 are threaded into the projection 16 at a point above the lowermost portion of the arms 12 and 14.

As thus positioned, the set screws 23 are substantially concealed for reasons of appearance and are so disposed that it is unlikely that they may come in contact with the fingers of the person operating the handle. In order to provide access to the set screws 23, as well as to permit their initial insertion, radial grooves 24 are provided on the underside of the arms 13 and 15.

The valve stem 25, which may be of any conventional type, is rigidly secured to the handle by inserting its upper end into the space 26 defined within the recess 17 and between the gripping sections of the jaws 18. The set screws 23 are then turned by means of a screwdriver, not shown, to move the jaws 18 radially within the recess 17 to bring the serrations or teeth 21 into contact with the upper end of the stem 25. It will be understood that the jaws 18 make a positive engagement with the stem 25 even though its upper end may be serrated or broached or whether it be round or square and regardless of whether it has become worn in service. It will also be noted that the replacement handle may be installed without removing the valve stem from its operative position within its associated valve structure, not shown. Furthermore, it is apparent that within the range of the recess 17 and jaws 18 stems of different diameters and different cross section sizes can be effectively gripped.

Figure 1:
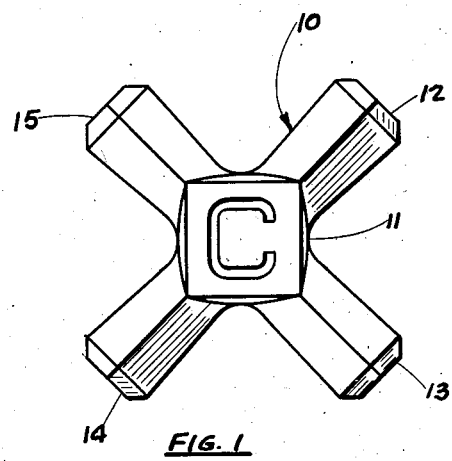
Figure 1 is a top plan view of a replacement handle embodying my invention.
Figure 2:
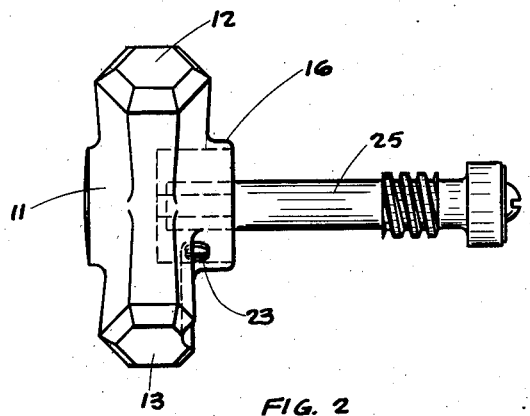
Figure 2 is a side elevation thereof showing the handle in position with respect to a conventional valve stem.
Figure 4:
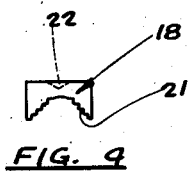
Figure 4 is a detail plan view of one of the gripping segments or jaws which is normally mounted within a recess in the handle.
Figure 5:
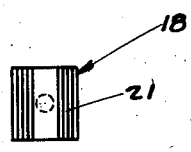
Figure 5 is a front elevation of the jaw shown in Figure 4.
Figure 6:
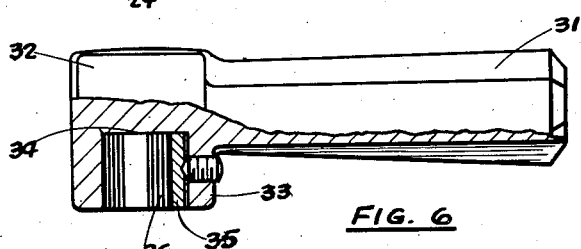
Figure 6 is a side elevation, partly in section, of a modified form of my handle.
Figure 7:
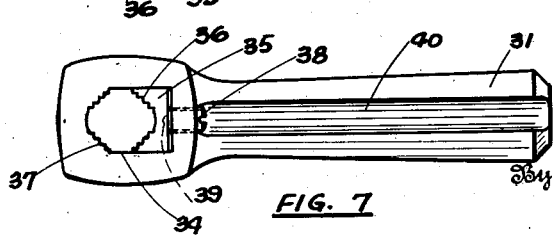
Figure 7 is a view of the underside of the replacement handle shown in Figure 6.

In the modification shown in Figures 6 and 7, a single arm 31 extends from the central hub 32. The projection 33 beneath the hub 32 encloses a recess 34. Either one or two jaws may be employed within the recess and as illustrated in the drawings, a single movable jaw 35 is slidably mounted for radial movement within the recess 34 and is provided with vertical serrations 36. The end of the recess 34 opposite the position of the jaw 35 is similarly provided with vertical serrations or teeth 37. A single set screw 38 is located directly beneath the arm 31 and engages a central depression 39 formed in the jaw 35 in the manner illustrated in Figures 4 and 5. A groove 40 is provided under the handle 31 for access to the set screw 38. It will be understood that the operation of engaging this handle with a valve stem is similar to that described above for the cross handle shown in Figures 1 to 3. The central depression provided in the back of each of the gripping jaws serves a two-fold purpose; the force supplied by the set screw meets the jaw at a central point and furthermore the inter-engagement thus provided between the jaw and set screw prevents the jaw from moving out of the recess and thus maintains the jaw, stem, and handle in assembled relationship.

From the above description it will be apparent that the gripping means employed is effective to rigidly connect the valve stem to the replacement handle and no play or lost motion can be present.

Having fully described my invention, it is to be understood that I do not wish to be limited to the details herein set forth except as described in the following claim.

I claim:

In a replacement handle for a valve stem, the combination of a central body portion having a lateral arm extending radially therefrom, the arm having a radially extending groove on its under side, a projection extending downwardly from the body portion, a recess defined within the body portion and projection and having parallel sides, a jaw slidably mounted within said recess between said parallel sides, said jaw having a V section provided with teeth for engaging a valve stem, and a threaded element at the inner end of the groove under the lateral arm adapted to advance the jaw within said recess.

LOUIS J. VESPER.

REFERENCES CITED

The following references are of record in the file of this patent:

UNITED STATES PATENTS

| Number | Name | Date |
| --- | --- | --- |
| 413,392 | Engert | Oct. 22, 1889 |
| 534,092 | Biddle | Feb. 12, 1895 |
| 1,878,569 | Zolleis | Sept. 20, 1932 |
| 2,004,187 | Bommer | June 11, 1935 |